(12) United States Patent
Gupta et al.

(10) Patent No.: US 11,556,562 B1
(45) Date of Patent: Jan. 17, 2023

(54) MULTI-DESTINATION PROBABILISTIC DATA REPLICATION

(71) Applicant: Kyndryl, Inc., New York, NY (US)

(72) Inventors: Manish Gupta, New Delhi (IN);
Sarbajit K. Rakshit, Kolkata (IN)

(73) Assignee: KYNDRYL, INC., New York, NY (US)

( * ) Notice: Subject to any disclaimer, the term of this patent is extended or adjusted under 35 U.S.C. 154(b) by 50 days.

(21) Appl. No.: 17/388,593

(22) Filed: Jul. 29, 2021

(51) Int. Cl.
*G06F 16/20* (2019.01)
*G06F 16/27* (2019.01)
*G06F 16/13* (2019.01)
*G06F 11/14* (2006.01)

(52) U.S. Cl.
CPC .......... *G06F 16/27* (2019.01); *G06F 11/1469* (2013.01); *G06F 16/137* (2019.01); *G06F 2201/84* (2013.01)

(58) Field of Classification Search
None
See application file for complete search history.

(56) References Cited

U.S. PATENT DOCUMENTS

| | | |
|---|---|---|
| 7,480,817 B2 | 1/2009 | Fan et al. |
| 7,650,529 B2 | 1/2010 | Fan et al. |
| 7,716,525 B1 | 5/2010 | Buchko et al. |
| 7,734,950 B2 | 6/2010 | Rogers |
| 8,904,231 B2 | 12/2014 | Coatney et al. |
| 9,110,964 B1 | 8/2015 | Shilane et al. |
| 9,563,683 B2 | 2/2017 | Abercrombie et al. |
| 10,341,285 B2 | 7/2019 | Warfield et al. |
| 10,360,168 B1 | 7/2019 | Griffin et al. |
| 10,601,909 B2 | 3/2020 | Brandwine et al. |
| 10,728,149 B1 | 7/2020 | Ramanujan et al. |

(Continued)

FOREIGN PATENT DOCUMENTS

| | | | | |
|---|---|---|---|---|
| EP | 2882150 A1 | 6/2015 | | |
| KR | 20220053386 A | * | 4/2022 | ............ H04L 47/36 |
| WO | WO-2016045332 A1 | * | 3/2016 | ............... H04L 1/00 |

OTHER PUBLICATIONS

EMC, "Data Replication with SyncIQ", Published Date: NA, 42 pages.

(Continued)

*Primary Examiner* — Jau Shya Meng
(74) *Attorney, Agent, or Firm* — John Kennel; Hunter E. Webb; Keohane & D'Alessandro PLLC

(57) ABSTRACT

Disclosed embodiments provide techniques for multi-destination probabilistic data replication. Data transfer occurs over multiple time intervals. A data image to be transferred is divided into chunks. A manifest is created that lists each chunk and specifies an order, such that the data image can be reconstructed at its destination. The manifest is sent to the destination. The chunks may be sent to the destination, or to an aggregator site that then forwards the chunks to the destination. The chunks are reassembled at the destination based on information in the manifest. A probabilistic function is used to select an aggregator site based on an efficacy. The efficacy is based on a reward function that is computed for destinations for each time interval. A data transfer policy is periodically updated with a new efficacy value which is used for adjustment of the probabilistic function.

20 Claims, 9 Drawing Sheets

(56) References Cited

U.S. PATENT DOCUMENTS

| | | |
|---|---|---|
| 2007/0177739 A1 | 8/2007 | Ganguly et al. |
| 2011/0022879 A1 | 1/2011 | Chavda et al. |
| 2011/0022882 A1 | 1/2011 | Jaehde et al. |
| 2014/0047263 A1 | 2/2014 | Coatney et al. |
| 2014/0269755 A1 | 9/2014 | Veiga |
| 2016/0381368 A1* | 12/2016 | Liao ............. H04N 19/164 375/240.26 |
| 2017/0139791 A1 | 5/2017 | Hagan et al. |
| 2017/0201429 A1 | 7/2017 | Gupta et al. |
| 2020/0192912 A1 | 6/2020 | Mitkar et al. |
| 2022/0286822 A1* | 9/2022 | Saxena ............. H04M 15/785 |

OTHER PUBLICATIONS

Sengupta et al., "Planning for Optimal Multi-site Data Distribution for Disaster Recovery", Published Date: Dec. 5, 2011, 12 pages.

\* cited by examiner

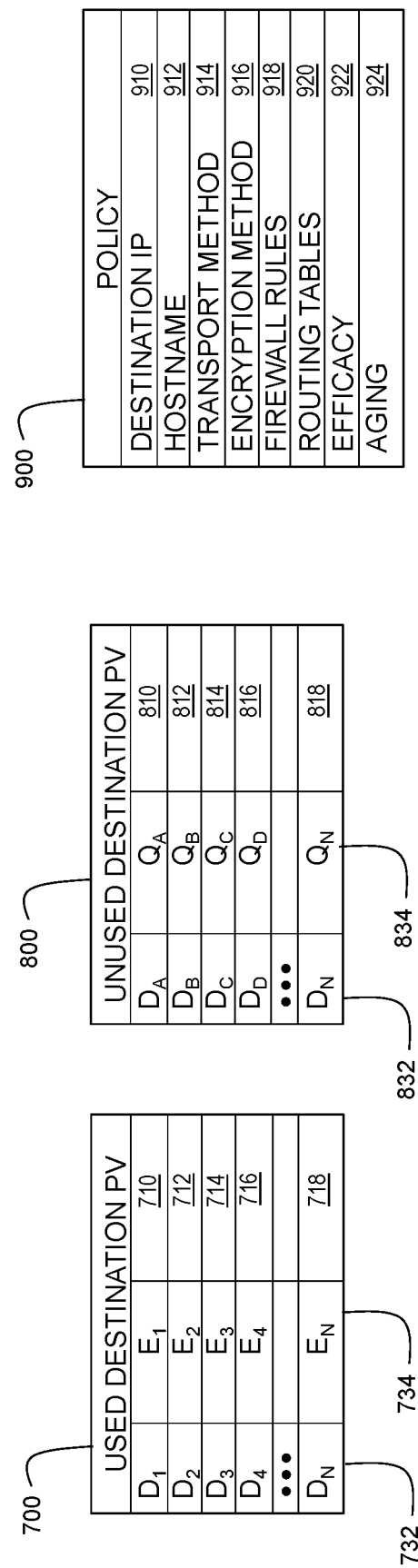

MULTI-DESTINATION PROBABILISTIC DATA REPLICATION

FIELD

Disclosed embodiments relate generally to computer systems, and more particularly, to multi-destination probabilistic data replication.

BACKGROUND

The amount of digital data stored in datacenters throughout the world continues to increase. These datacenters provide storage for e-commerce, finance, and a wide variety of other applications. Datacenters rely on data replication to ensure reliable data access. Data replication involves storing the same data in multiple locations to improve data availability and accessibility, as well as to improve system resilience and reliability.

Data replication has a variety of uses. One common use of data replication is for disaster recovery, ensuring that an accurate backup exists at all times in case of a catastrophe, hardware failure, or a system breach where data is compromised. Data replication can also serve to improve access times, especially in organizations with a large number of locations. For example, users in Asia or Europe may experience latency when reading data in North American datacenters. Storing a replica of the data closer to the user can improve access times and balance the network load. Thus, efficient data replication is vital to smooth operation of computer systems.

SUMMARY

In one embodiment, there is provided a computer-implemented method for transferring a disaster recovery replication image, comprising: obtaining a time interval; obtaining a data transfer size for a data image; dividing the data image into a plurality of chunks; generating a manifest, wherein the manifest identifies an assembly order for each chunk of the plurality of chunks; selecting an aggregator site for each of the chunks of the plurality of chunks; transferring each chunk of the plurality of chunks to a corresponding aggregator site; obtaining an actual data transfer rate for each chunk of the plurality of chunks; computing a reward function for each aggregator site based on the actual data transfer rate; computing an efficacy for each aggregator site based on the reward function; and updating a data transfer policy with the computed efficacy.

In another embodiment, there is provided an electronic computation device comprising: a processor; a memory coupled to the processor, the memory containing instructions, that when executed by the processor, cause the electronic computation device to: obtain a time interval; obtain a data transfer size for a data image; divide the data image into a plurality of chunks; generate a manifest, wherein the manifest identifies an assembly order for each chunk of the plurality of chunks; select an aggregator site for each of the chunks of the plurality of chunks; transfer each chunk of the plurality of chunks to a corresponding aggregator site; obtain an actual data transfer rate for each chunk of the plurality of chunks; compute a reward function for each aggregator site based on the actual data transfer rate; compute an efficacy for each aggregator site based on the reward function; and update a data transfer policy with the computed efficacy.

In yet another embodiment, there is provided a computer program product for an electronic computation device comprising a computer readable storage medium having program instructions embodied therewith, the program instructions executable by a processor to cause the electronic computation device to: obtain a time interval; obtain a data transfer size for a data image; divide the data image into a plurality of chunks; generate a manifest, wherein the manifest identifies an assembly order for each chunk of the plurality of chunks; select an aggregator site for each of the chunks of the plurality of chunks; transfer each chunk of the plurality of chunks to a corresponding aggregator site; obtain an actual data transfer rate for each chunk of the plurality of chunks; compute a reward function for each aggregator site based on the actual data transfer rate; compute an efficacy for each aggregator site based on the reward function; and update a data transfer policy with the computed efficacy.

BRIEF DESCRIPTION OF THE DRAWINGS

FIG. 7 shows an example of a used destination probability vector in accordance with embodiments of the present invention.

FIG. 8 shows an example of an unused destination probability vector in accordance with embodiments of the present invention.

FIG. 9 shows an example of a policy in accordance with embodiments of the present invention.

Figure 1:
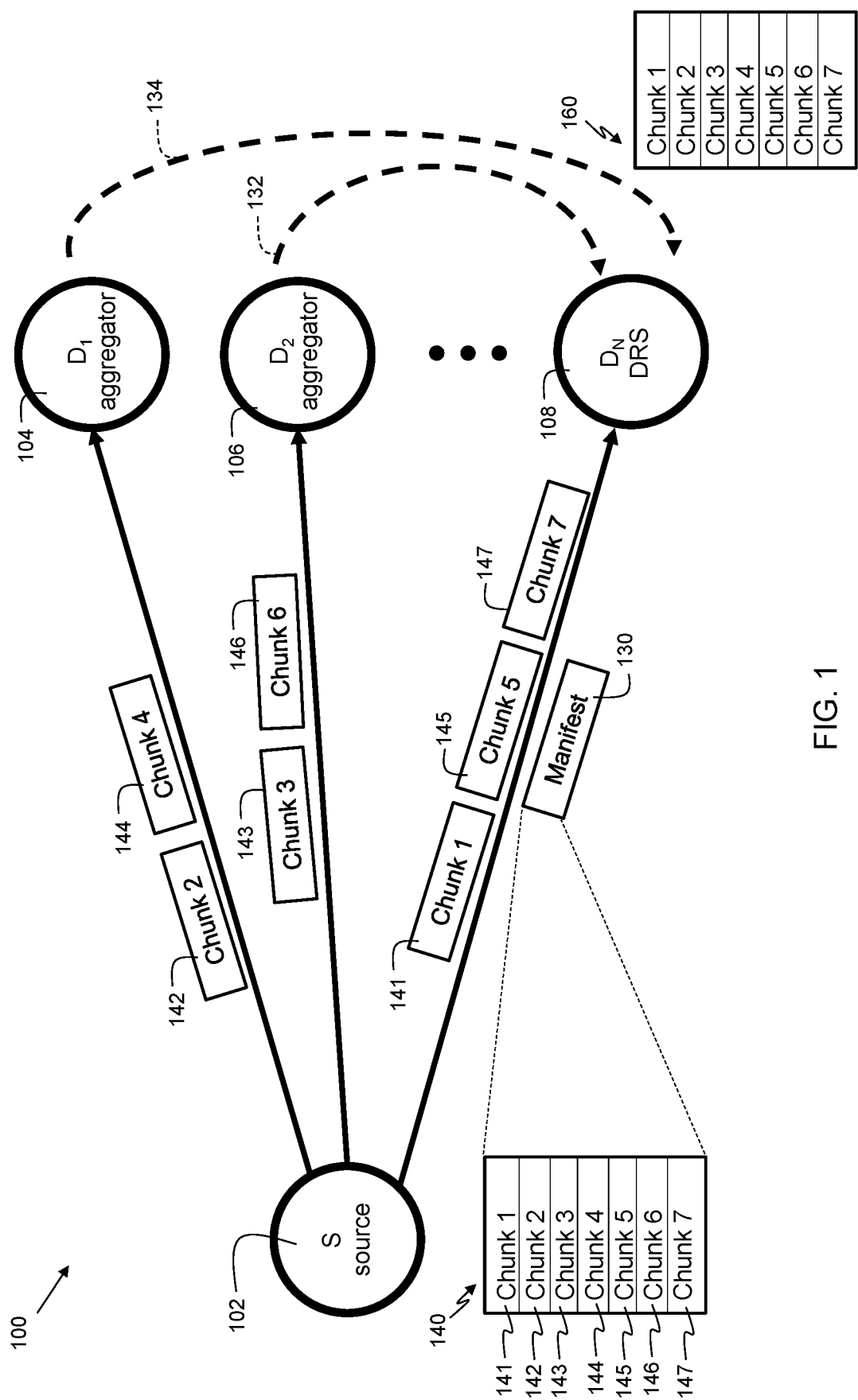
FIG. 1 shows data replication in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for multi-destination probabilistic data replication. Data transfer occurs over multiple time intervals. A data image to be transferred is divided into chunks (i.e., pieces smaller than the whole). A manifest is created that lists each chunk and specifies an order, such that the data image can be reconstructed at its destination. The manifest is sent to the destination. The chunks may be sent to the destination, or to an aggregator site (node) that then forwards the chunks to the destination. The chunks are reassembled at the destination based on information in the manifest. A probabilistic function is used to select an aggregator site based on an efficacy. The efficacy is based on a reward function that is computed for destinations for each time interval. A data transfer policy is periodically updated with a new efficacy value which is used for adjustment of the probabilistic function.

Data replication is a vital component for achieving high reliability in terms of data access and data integrity. It is desirable to back up data images as efficiently as possible to minimize the risk of data loss. As an example, when a datacenter experiences a power outage, the datacenter may operate on backup power for a very limited amount of time before going offline. Due to the limited amount of available operating time while on backup power, it is desirable to transfer a data image to a backup destination as quickly as possible. However, due to constantly changing network conditions, the direct route to the destination may not necessarily be the most efficient at a particular point in time. Disclosed embodiments accommodate dynamically changing network conditions such as network congestion by splitting the data image (data to be replicated) into multiple chunks, and sending the chunks to multiple sites. One of the sites may be the intended destination for the replicated data image (DRS). Other sites can include aggregator sites that are configured to forward chunks to the destination site for reconstruction of the data image. Periodically, the efficacy of each site is re-evaluated. The efficacy is used in a probabilistic selection process for future selections of sites. Sites that exhibit good performance are more likely to be selected. The probabilistic selection function provides a mechanism for selection of new sites, and/or selection of sites that previously exhibited poor performance. This allows disclosed embodiments to adapt to changing network conditions, addition and removal of disaster recovery sites and aggregator sites. Aggregator sites and disaster recovery sites are generally referred to as destination nodes. As nodes come online and/or go offline, or experiences changes in performance due to load balancing, network conditions, or other reasons, disclosed embodiments adapt to these changing conditions to provide improved data replication performance.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 shows a diagram 100 of data replication in accordance with embodiments of the present invention. Diagram 100 includes a source node 102. The source node 102 can represent a computer, computing cluster, collection of virtual machines, containerized applications, datacenter, or other collection of computers for which data is to be replicated (i.e., "backed up from"). Destination node 108 represents the computer, computing cluster, collection of virtual machines, containerized applications, datacenter, or other collection of computers for which data is to be saved (i.e., "backed up to"). Thus, destination node 108 is a disaster recovery site (DRS).

Data image 140 represents data on the source node 102 that is to be replicated to destination node 108. To perform the data replication, the data image 140 is divided into multiple chunks. In this example, the data image is divided into seven chunks, indicated as chunk 1 (141), chunk 2 (142), chunk 3 (143), chunk 4 (144), chunk 5 (145), chunk 6 (146), and chunk 7 (147). In practice, the data image 140 can be divided into thousands, millions, or billions of chunks for transferring.

A manifest 130 that contains a list of chunks and a corresponding identifier such as a hash or checksum is sent to the destination node 108. In embodiments, the manifest 130 can be a file in text format, XML format, yamI format, or other suitable format. The manifest also conveys the order of each chunk. This allows the image 140 to be reconstructed as disaster recovery replication image 160 at destination node 108.

The chunks of data are sent to multiple nodes. Some chunks may be sent to node 104, which represents a first aggregator site $D_1$. Some chunks may be sent to node 106, which represents a second aggregator site $D_2$. While two aggregator sites are shown in FIG. 1, in practice there can be hundreds or thousands of aggregator sites.

In the example, chunk 2 (142) and chunk 4 (144) are sent from the source node 102 to the first aggregator site 104. The first aggregator site 104 then forwards chunk 2 and chunk 4 to the destination node 108, as indicated by arrow 134. Similarly, chunk 3 (143) and chunk 6 (146) are sent from the source node 102 to the second aggregator site 106. The second aggregator site 106 then forwards chunk 3 and chunk 6 to the destination node 108, as indicated by arrow 132. Chunk 1 (141), chunk 5 (145), and chunk 7 (147) are sent to the destination node 108 without use of an aggregator node.

The destination node 108 re-assembles the chunks to form a duplicate data image (disaster recovery replication image) 160. The chunks may be received by the destination node 108 out of order. Information in the manifest 130 can be used to assemble the duplicate data image 160 such that each chunk is in the proper order. Once all the chunks are received by the destination node 108, the chunks may then be concatenated together in the original order of data image 140 to construct the duplicate data image 160.

Disclosed embodiments measure the efficacy of data transmission to each node that participates in the data replication. The selection of which node(s) to use to transmit chunks to is based on a probabilistic mechanism that is a function of the efficacy.

Figure 2:
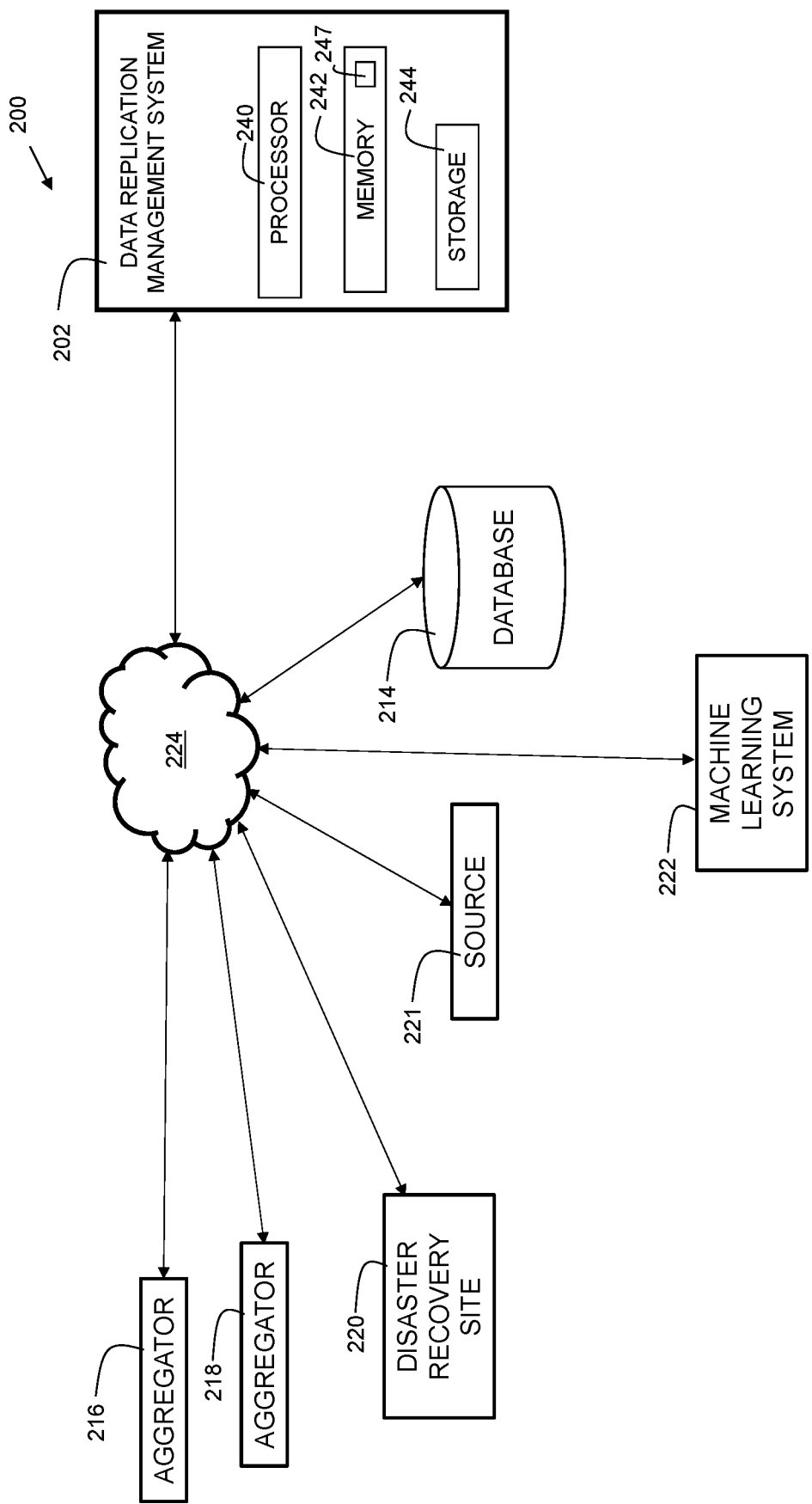
FIG. 2 shows an environment for embodiments of the present invention.

FIG. 2 is an environment 200 for embodiments of the present invention. At 202, there is a data replication management system (DRMS). System 202 is an electronic computation device. System 202 includes a processor 240, memory 242, and storage 244. Memory 242 comprises instructions 247, which when executed by the processor, cause system to implement embodiments of the invention. System 202 is in communication with network 224. Network 224 may be the internet, a wide area network, a local area network, a cloud network, or other suitable network.

Multiple nodes are connected to network 224. Source node 221 represents a computer, computing cluster, collection of virtual machines, containerized applications, datacenter, or other collection of computers for which data is to be replicated. Disaster recovery site (DRS) 220 represents a computer, computing cluster, collection of virtual machines, containerized applications, datacenter, or other collection of computers to which the data replication image is sent. Node 216 and node 218 each represent a computer, computing cluster, collection of virtual machines, containerized applications, datacenter, or other collection of computers which may receive some of the chunks of the data replication image, and then forward these chunks to the DRS node 220.

Database 214 is connected to network 224. Database 214 stores information used the DRMS 202. This information can include data transfer policies. The data transfer policies can include various metadata for a given destination. The metadata can include, but is not limited to, a destination internet protocol (IP) address, a hostname, a transport method, an encryption method, firewall rules, routing tables, and/or an efficacy.

Also connected to network 224 is machine learning system 222. In some embodiments, machine learning system 222 is used to perform various functions in accordance with embodiments of the present invention. These functions can include, but are not limited to, estimating a data transfer size, estimating an efficacy, estimating network bandwidth, and estimating latency.

In some embodiments, the DRMS is a standalone electronic computation device. It communicates data transfer instructions to the various nodes to initiate data transfers of chunks to the appropriate node. In some embodiments, a data replication management system may be incorporated in to the source node 222, DRS node 220, and/or aggregator node 216 and/or aggregator node 218.

The intervening network bandwidth between the source 216 and the DRS node 220 is variable. It will therefore increase the risk of loss of data whenever the bandwidth decreases. Disclosed embodiments mitigate this risk by selecting aggregator sites using a probabilistic function, in order to increase the likelihood of successful data replication.

Figure 3:
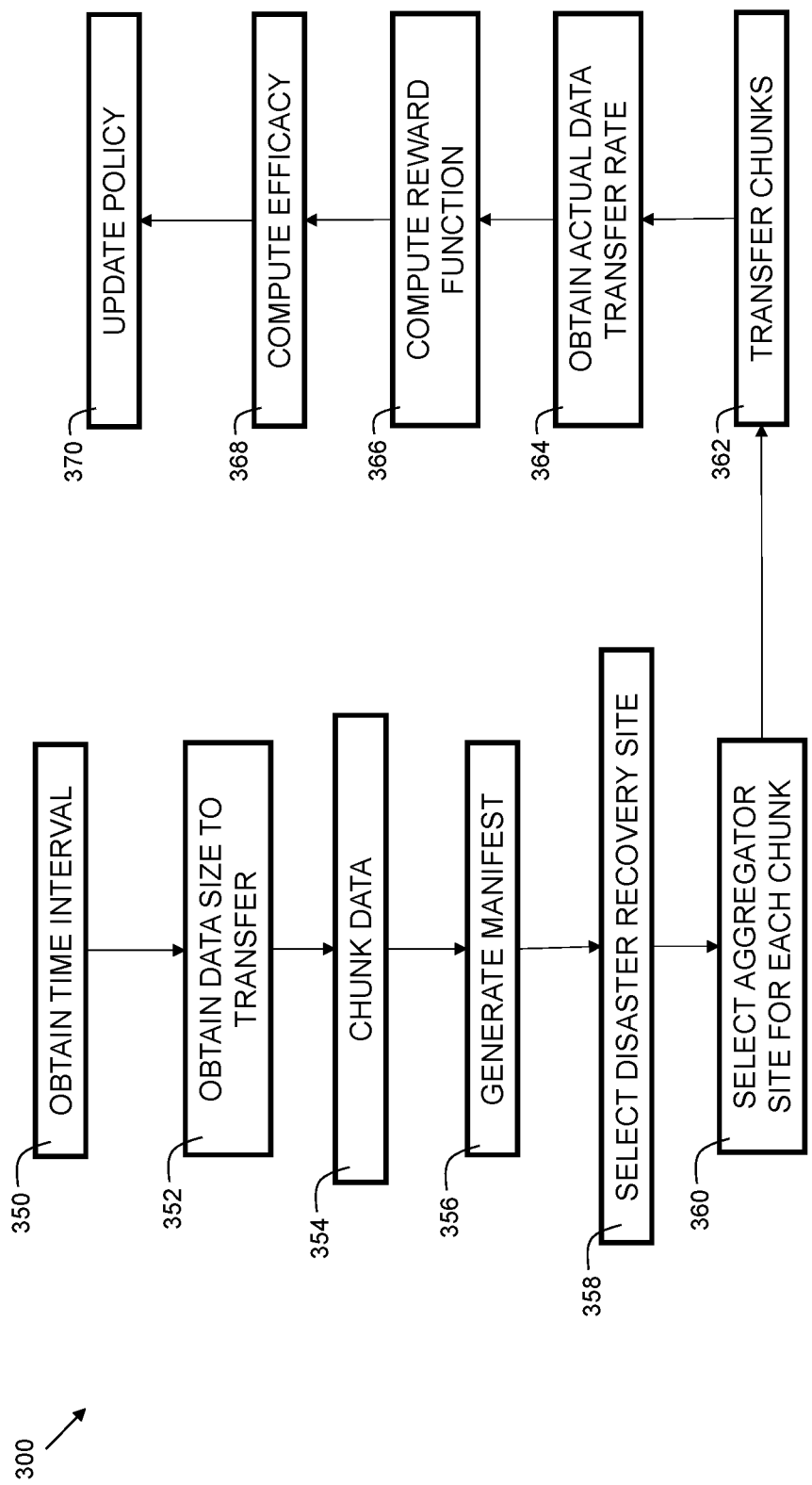
FIG. 3 is a flowchart indicating process steps for embodiments of the present invention.

FIG. 3 is a flowchart 300 indicating process steps for embodiments of the present invention. At 350, a time interval is obtained. In some embodiments, the time interval has a value ranging from 30 minutes to 60 minutes. Other time intervals are possible. The time interval defines the frequency at which efficacy of a node is re-evaluated. At 352, a data size for transfer is obtained. This data size may be the size of a file, collection of files, disk image, or other data image that is to be replicated. In some embodiments, a component such as a snapshot agent executes on each node, and keeps track of changed disk blocks since the previous data replication. This allows for incremental data replication, where only changed blocks/chunks are transferred.

At 354, the data image is divided into chunks. In some embodiments, the chunks are equal in size, and in some embodiments, they are not equal. In some embodiments, the chunks can vary in size. In some embodiments, a chunk may be padded with null bytes if it is the last chunk of the image. At 356, a manifest is generated. The manifest may include an ordered listing with an entry for each chunk. The entry can include a unique identifier. The unique identifier can include a hash. In embodiments, the hash is computed via an md5 hashing technique, a sha256 hashing technique, or other suitable hashing technique.

At 358, a disaster recovery site is selected. In some embodiments, the disaster recovery site is selected based on a probability that is a function of a computed efficacy. In some embodiments, the disaster recovery site is selected a priori based on a configuration setting. The disaster recover site may be a computer, computing cluster, collection of virtual machines, containerized applications, datacenter, or other collection of computers for which data is to be saved (i.e., "backed up to").

At 360, an aggregator site for each chunk is selected. The aggregator site may be a computer, computing cluster, collection of virtual machines, containerized applications, datacenter, or other collection of computers for which data is to be sent from the source node, and then forwarded by the aggregator site to the destination node. This selection is made using a probabilistic algorithm. In embodiments, an aggregator site is classified as "previously used" if it has been used for receiving a chunk within a predetermined duration from the present time (e.g., received a chunk within the past 72 hours). Similarly, an aggregator site that has not received a chunk within the predetermined time is classified as "unused" (e.g., a site that has not received a chunk within the past 72 hours). A probability is established for selecting a previously used aggregator site. The probabilities for selecting the sites may be stored in a data structure, which may be referred to as a vector, where the i-th element of the vector is the probability of sending a chunk to the DRS node from the source via the aggregator node i. A data transfer policy associated with the aggregator site contains an efficacy value that was established during previous use. The efficacy is a measure of how efficient data transfer to a given node is, based on previous data transfers. The higher the efficacy, the higher the probability that the aggregator site will be selected for a future data transfer. There is a non-zero probability that an aggregator site with a lower efficacy will get selected. This mechanism allows a "retry" of aggregator sites that previously were determined to have a lower efficacy. This is useful in data replication since transient conditions such as network congestion can cause efficacy of a node to temporarily drop. The probabilistic selection of disclosed embodiments enables a retry of such nodes. If the transient conditions that caused network congestion are resolved, the efficacy of that node will increase on its next usage, increasing the probability that the node will be used again in a future data transfer of a chunk.

In some embodiments, the number of chunks to send may be divided by the number of aggregator sites that are to be used, to achieve some load balancing for the transmission of data chunks. As an example, if a data image is divided into one hundred chunks, and there are four aggregator sites, then 25 chunks may be sent to each aggregator site. In some embodiments, one of the aggregator sites can also be the disaster recovery site (node). In some embodiments, the probability vector can be created such that it has its components proportional to the speed of the links from the source node (102) to each of the aggregator sites and the speed of the links from the aggregator sites to the DRS node.

At 362, the chunks are transferred to their respective sites. The transfer may be performed using TCP/IP, or other suitable communication protocol. The chunk data may be encrypted prior to transmission. The encryption can include RSA (Rivest-Shamir-Adleman), AES (Advanced Encryption Standard), or other suitable technique.

At 364, an actual data transfer rate is obtained. This may be accomplished using timestamps. A timestamp may be appended to the chunk at the time of sending from a source site. The time that the chunk arrives at the destination site is recorded, and a difference between the arrival time and the timestamp indicates a latency, or travel time of the chunk. This travel time is sent back to the data replication management system which computes a reward function at 366. In some embodiments, the reward function R is computed as shown below:

$$R_i = -(1-(C_i/S_i))$$

Where $R_i$ is the reward function for aggregator node i;

$S_i$ is the number of bytes sent from source node to DRS node via the aggregator node i over a given time interval; and $C_i$ is the number of bytes received at the DRS node from the source node via the aggregator node i over that same time interval. In this embodiment, an ideal transmission rate, where the number of transmitted bytes is the same as the number of sent bytes, results in a reward function of zero. Anything less than an ideal transmission rate results in a negative reward value. As an example, if half of the sent bytes (or other data size unit) that were sent are received in a given time interval, then the reward function R is –0.5. Thus, in some embodiments, computing the reward function comprises computing a negated value of one minus a ratio of received data to sent data.

At 368, an efficacy E is computed as:

$$E_i = f(R_i, L_i)$$

Where $E_i$ is the efficacy for node i, as a function of its reward function $R_i$ and a latency value $L_i$. In some embodiments, the reward function $R_i$ may be multiplied by a constant, and that product divided by the latency $L_i$, to obtain the efficacy $E_i$. In some embodiments, $L_i$ is a value in milliseconds, indicating the travel time from source to destination for a chunk. Thus, in general, the efficacy E increases as the reward function R increases, and decreases as the latency L increases.

At 370, a data transfer policy is updated with the efficacy value. The efficacy value is used to derive a probability for selecting node i for a future data transfer.

Figure 4:
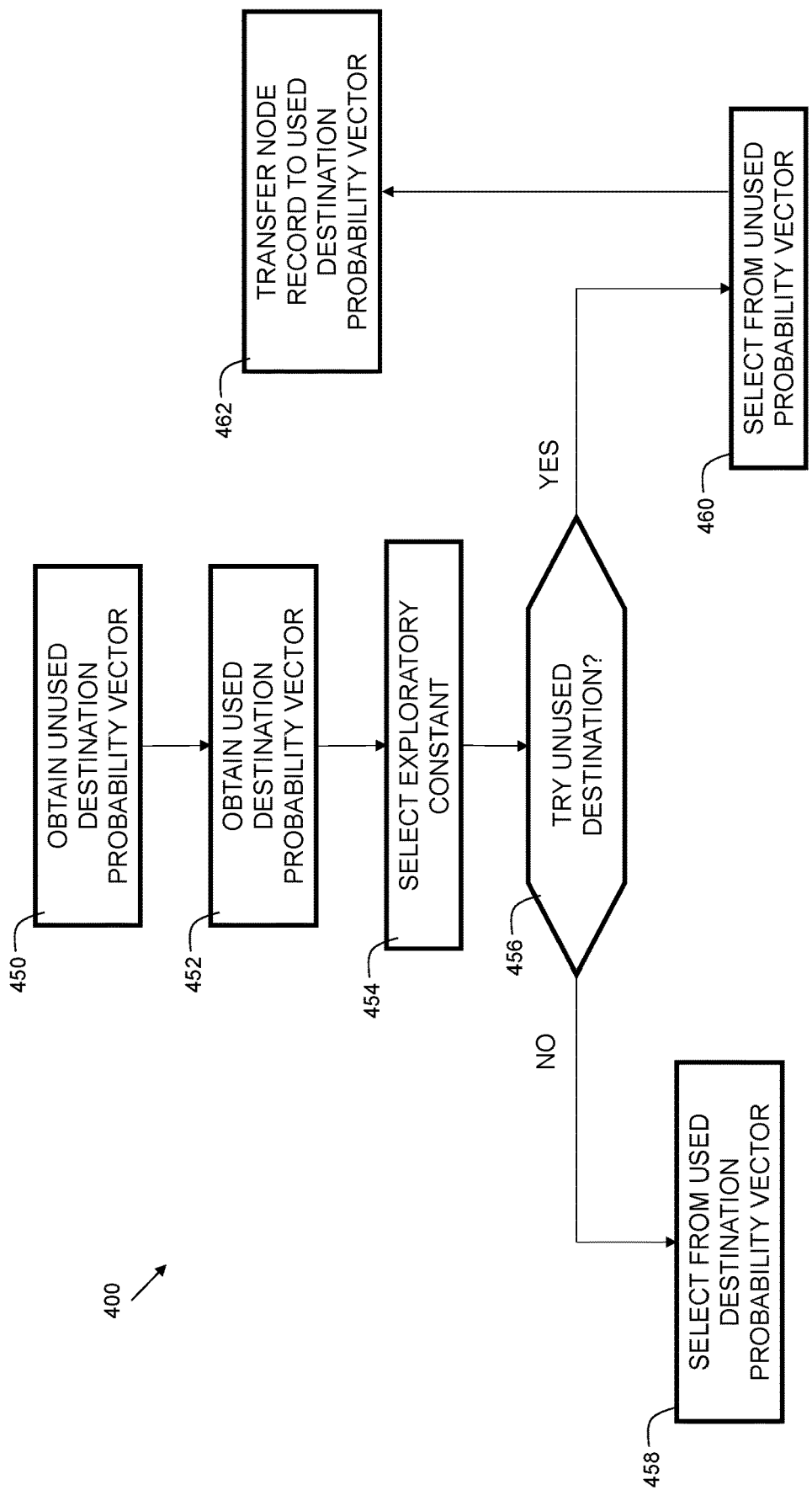
FIG. 4 is a flowchart showing additional process steps for embodiments of the present invention.

FIG. 4 is a flowchart 400 showing additional process steps for embodiments of the present invention. An unused policy is a data transfer policy that has not been used to transfer data within a predetermined time interval G. As an example, G may be 72 hours. With this example, a policy that has not been used in at least 72 hours may be considered to be an "unused" policy. Similarly, a policy that has been used within the past 72 hours is considered to have been used. In some embodiments, an unused policy can also be considered as one where there is at least one node for which the policy requires a different probability of chunks to be sent to that node as compared to any of the policies used so far.

At 450, an unused destination probability vector is obtained. This vector is a data structure containing unused policies and a corresponding probability for selecting one of the policies represented in the unused destination probability vector.

At 452, a used destination probability vector is obtained. This vector is a data structure containing used policies and a corresponding probability for selecting one of the policies represented in the used destination probability vector.

At 454, an exploratory constant ε is selected. The exploratory constant ε is a value ranging from 0 to 1. At 456, a determination to try an unused destination is made. In embodiments, a probabilistic function is used, and based on a probability as determined by the exploratory constant ε, an unused destination is selected. Similarly, there is a probability of (1–ε) that a previously used policy is selected. An exploratory constant of 0 is a special case in which only a previously used policy is selected. An exploratory constant of 1 is a special case in which only an unused policy is selected. An exploratory constant at a value in between 0 and 1 is a configuration where an unused policy is selected with a certain probability, and a used policy is selected with one minus that probability.

Embodiments can include obtaining an unused destination probability vector; obtaining a used destination probability vector; obtaining an exploratory constant; and selecting a destination from the unused destination probability vector based on a probability having a value of the exploratory constant. Embodiments can include selecting a destination from the used probability vector based on a probability having a value of one minus the exploratory constant. In some embodiments, the exploratory constant has a value ranging from 0.1 to 0.25. With a setting of ε in this range, it is more likely that a previously used policy will be selected, but on some occasions, an unused policy is selected for data transmission.

If NO at 456, then a policy is selected from a used destination probability vector at 458. In embodiments, the selection of a node (aggregator/DRS) from within the used destination probability vector is made using the following probabilistic equation:

$$Ui = \frac{Ei}{\sum(E)}$$

Thus, the probability of selecting a given node i is performed with probability $U_i$, where $U_i$ is equal to the efficacy $E_i$ of node i, divided by the sum of all the efficacies within the used destination probability vector, where E(E) represents the sum of all the efficacies. In this way, nodes with a higher efficacy are more likely to be selected. Thus, disclosed embodiments enable exploring the space of probabilistic policies to help identify more effective data transfer policies.

If YES at 456, then a policy is selected from an unused destination probability vector at 460. In some embodiments, a destination may be selected from the unused destination probability vector at random, where there is an equal probability of selecting any destination from within the unused destination probability vector. At 462, the policy selected at 460 is transferred to the used destination probability vector, since it has now been selected for use.

Figure 5:
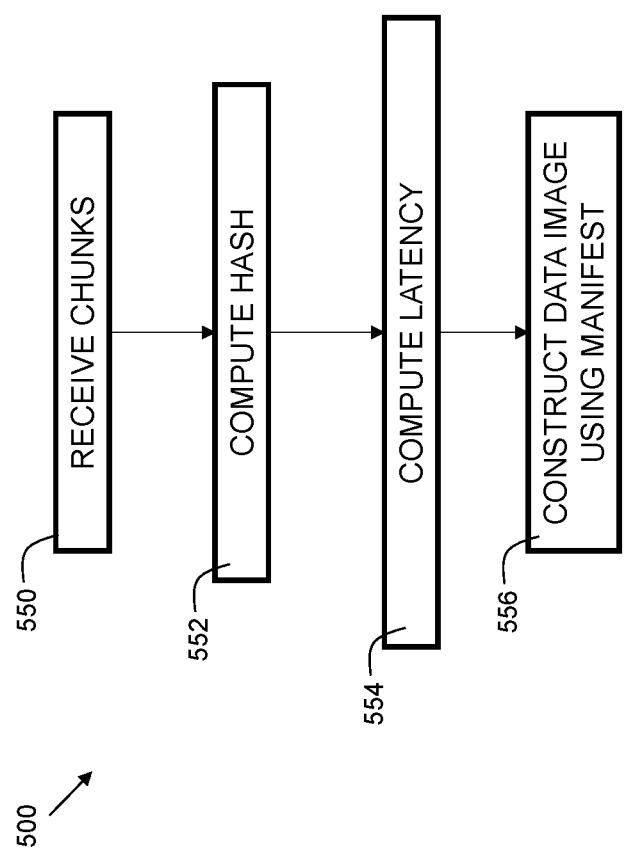
FIG. 5 is a flowchart showing additional process steps for embodiments of the present invention.

FIG. 5 is a flowchart 500 showing additional process steps for embodiments of the present invention. These steps pertain to the construction of a duplicate data image at a destination node (e.g., 108 of FIG. 1). At 550, data chunks are received. The data chunks may be stored in an intermediate location in computer storage such as memory and/or disk storage. For each data chunk, a hash is computed. At 554, a latency is computed. This can be performed by comparing a time of receiving the chunk with a timestamp appended to the chunk, that indicates the time of sending. In embodiments, the timestamp is in GPS seconds, Unix seconds, or number of seconds from another suitable epoch. The latency is reported to the DRMS as an input for efficacy computations.

At 556, the data image is constructed using the manifest (e.g., 130 of FIG. 1). In embodiments, the manifest contains an ordered list of hashes of each chunk. The hashes computed at 552 are identified in the manifest, and the chunks are assembled in the order specified in the manifest. In this way, a data image (e.g., 160 of FIG. 1) is constructed at a destination node (e.g., 108 of FIG. 1) that is identical to a data image (e.g., 140 of FIG. 1) sent from a source node (e.g., 102 of FIG. 1).

Figure 6:
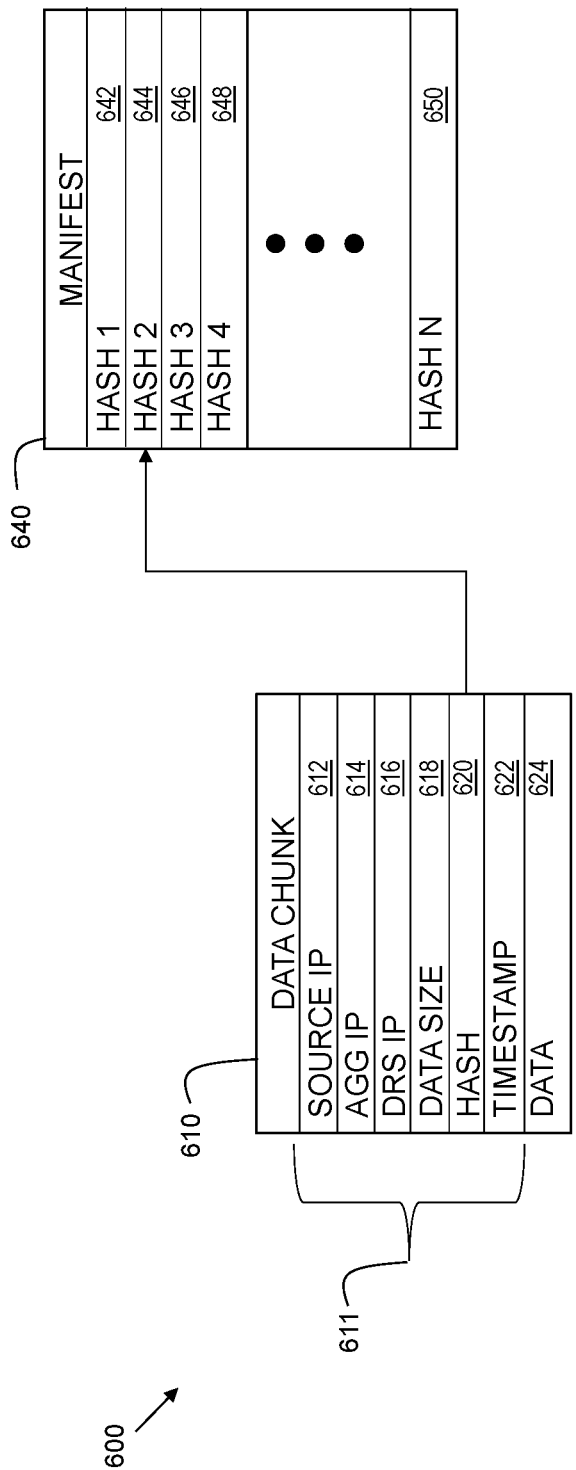
FIG. 6 shows data structures in accordance with embodiments of the present invention.

FIG. 6 is a diagram 600 showing data structures in accordance with embodiments of the present invention. Data structure 610 is a data chunk used in embodiments of the present invention. Data structure 610 includes a header 611 that is prepended to chunk data 624. The header 611 may include a source IP address 612, indicating the originating node. The header may include an aggregator IP address 614, indicating an intermediate destination for this chunk. The header may include a data replication site (DRS) IP address 616, indicating a final destination for this chunk. When the addresses in fields 614 and 616 differ, the aggregator node forwards the data chunk to the DRS IP address specified at 616. When the addresses in fields 614 and 616 are identical, the receiving node stores the data chunk for use in constructing a duplicate data image (e.g., 160 of FIG. 1).

Data structure 640 is an exemplary manifest. The manifest comprises an ordered list of hashes, indicated as 642, 644, 646, 648 and 650. In practice there can be more or fewer hash entries than shown in FIG. 6. In the example, the hash 620 matches the value of hash 2 (644), indicating that the data chunk in data structure 610 is the second data chunk in a data image. The use of the hash function allows for determination of the order of the chunks by comparing it with the order in the manifest.

Embodiments can include computing a hash for each chunk of the plurality of chunks; and recording the hash in a manifest file. In some embodiments, computing the hash comprises computing an md5 hash. In some embodiments, computing the hash comprises computing a sha256 hash.

The header 611 may include a timestamp 622. The timestamp 622 may be a time, in seconds, when the chunk was sent. The time may be in GPS seconds, Unix seconds, milliseconds, microseconds, or other suitable time measurement system. The timestamp may be compared with the arrival time at a destination to determine a latency.

FIG. 7 shows an example of a used destination probability vector 700 in accordance with embodiments of the present invention. The probability vector 700 contains a column 732 with a destination identifier. The destination identifier can be an IP address, hostname, or other unique identifier for identifying a destination. Additional policy information may also be included for each entry in probability vector 700. The probability vector 700 contains a corresponding efficacy value for each destination node at column 734. Each row is labeled, shown as 710, 712, 714, 716, and 718. An entry in the used destination probability vector 700 can be specified using column and row notation. For example, the destination identifier $D_3$ is located at row 714 column 732. The corresponding efficacy for $D_3$ is $E_3$, which is located at row 714 column 734. Embodiments can include creating a used destination probability vector, wherein the used destination probability vector includes an efficacy value corresponding to a previously used aggregator site.

FIG. 8 shows an example of an unused destination probability vector 800 in accordance with embodiments of the present invention. The probability vector 800 contains a column 832 with a destination identifier. The destination identifier can be an IP address, hostname, or other unique identifier for identifying a destination. Additional policy information may also be included for each entry in probability vector 800. The probability vector 800 contains a corresponding estimated efficacy value for each destination node at column 834. Each row is labeled, shown as 810, 812, 814, 816, and 818. An entry in the unused destination probability vector 800 can be specified using column and row notation. For example, the destination identifier $D_C$ is located at row 814 column 832. The corresponding efficacy for $D_C$ is $Q_C$, which is located at row 814 column 832. In embodiments, the estimated efficacy Q can be set to a nominal value, or based off of actual efficacy values for similar nodes in the used destination probability vector 700. Embodiments can include creating an unused destination probability vector, wherein the used destination probability vector includes an efficacy value corresponding to an unused aggregator site.

FIG. 9 shows an example of a policy 900 in accordance with embodiments of the present invention. The policy corresponds to a node, such as an aggregator site or disaster recovery site. The policy can contain various metadata used to facilitate transfer of a chunk. The policy can include an IP address for the node at 910. The IP address field can include an IPv4 and/or an IPv6 address value. The policy may further include a hostname at 912. The policy can include a transport method 914. The transport method can include http, ftp, tftp, and/or other suitable transfer protocols. The policy may further include an encryption method 916. The encryption method can include RSA, AES, none, or other suitable encryption mechanism. The policy may further include one or more firewall rules at 918. The firewall rules can stipulate ports to use, burst rates, and/or other information for successfully transmitting data to the destination node. The policy further includes an efficacy 922. The efficacy is updated after each use of the node for transferring of a chunk, based on latency, reward function, and/or other criteria. The policy may further include an aging field 924. In embodiments, the aging field is a value A that is decremented at a rate of once per second. Each time the policy is used, the aging value is reset to a default value. If the aging value reaches zero, then the policy is deemed an unused policy. Upon becoming an unused policy, it may be transferred to the unused destination probability vector, since it has "aged out" of use, and is now considered unused. As an example, the default value for A may be 259,200 seconds. With each second that elapses, the aging field is decremented. After 12 hours, the aging value is then 216,000. If, at that time, the node is used again, the aging value is reset to 259,200. If the aging value reaches zero (in this example, after 72 hours without use), the policy is considered "unused" and placed in the unused destination probability vector 800. In embodiments, a process within the DRMS scans the policies, and moves them to the appropriate vector based on the value in aging 924. Thus, the policy defines a destination, a probability of selecting that destination, as well as other metadata used in sending data to that destination.

Disclosed embodiments can include the following efficacy update approach that complements the above. A policy vector v (where element i corresponds to the efficacy of aggregator i) used by DRMS 202 to decide which aggregator should be on the path of the next chunk to be sent to the DRS 220. This policy vector is fixed for an interval and applied for each chunk in the given time interval. Then after the end of the time interval t and at the start of the next time interval t+1 we update the policy vector as follows:

$$Q(D,v):=(1-\gamma)Q(D,v)+\gamma E$$

Where:

Q(D, v) is the utility of applying policy vector v when the data transferred in an interval is D, $0<\gamma\ll 1$ is a learning constant, and E is a scalar that represents the reward for example E:=$\min_i E_i$ The above update happens when a policy v is chosen in 458 (already tried policies). The values of Q(D, v) are initialized randomly.

If 460 was chosen in FIG. 4 then a new probability vector v is constructed which is not already used earlier.

Figure 10:
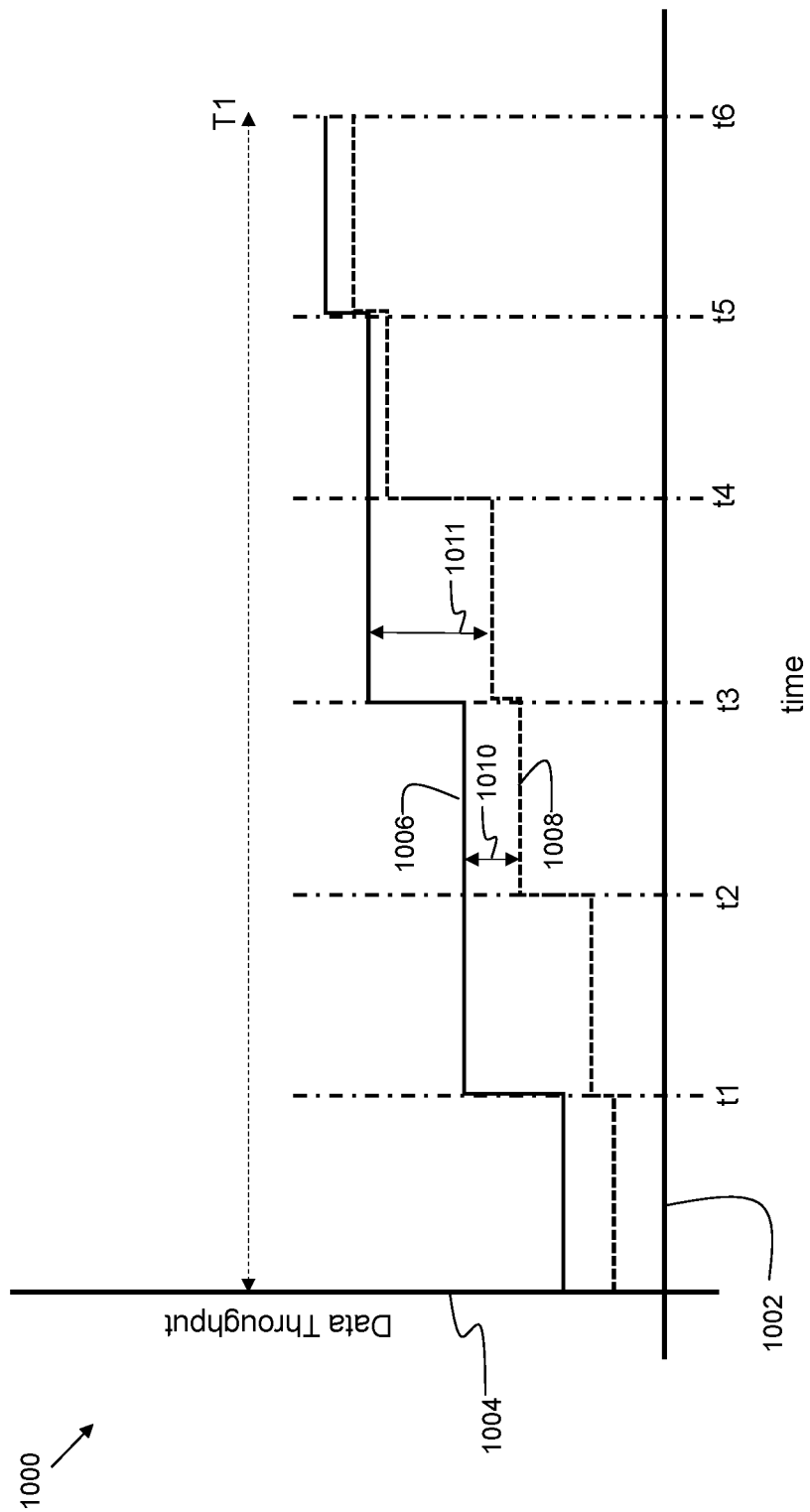
FIG. 10 is a graph showing time-sliced monitoring in accordance with embodiments of the present invention.

FIG. 10 is a graph 1000 showing time-sliced monitoring in accordance with embodiments of the present invention. The horizontal axis 1002 represents time. The vertical axis 1004 represents data throughput. T1 represents a time interval such as obtained at 350 in FIG. 3. The time interval T1 is divided into intermediate times denoted by times t1, t2, t3, t4, t5, and t6. A curve 1006 represents bytes of data sent by a source node. A curve 1008 represents bytes of data received by a receiving node (aggregate site and/or disaster recovery site). The difference between curve 1006, and curve 1008, which is indicated generally as 1010, represents an amount of latency for the node. As can be seen, the difference 1010 is less than difference 1011, meaning there is more latency at the subinterval between times t3 and t4, than at the subinterval between times t2 and t3. In embodiments, a reward function is computed for each subinterval. This may be accomplished using the previously described formula:

$$R_i = -(1-(C_i/S_i))$$

In some embodiments, the reward function is computed at each subinterval, and then averaged over the number of subintervals to derive an average reward function. In embodiments, the average reward function is used to compute the efficacy using the previously described formula:

$$E_i = f(R_i, L_i)$$

Figure 11:
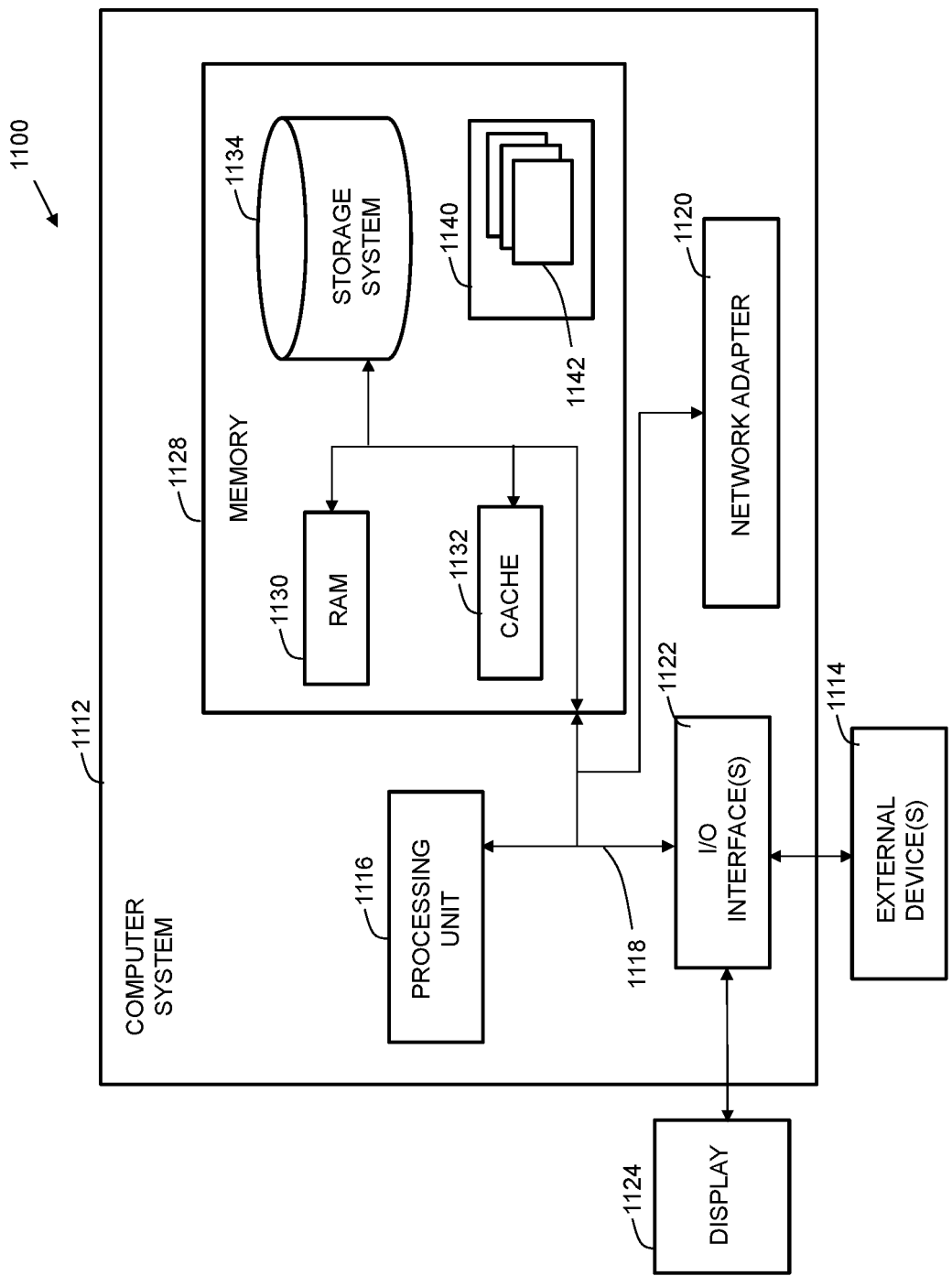
FIG. 11 shows a computerized implementation of disclosed embodiments.

Referring now to FIG. 11, a computerized implementation 1100 of an embodiment for multi-destination probabilistic data replication is described in further detail. Computerized implementation 1100 is only one example of a suitable implementation and is not intended to suggest any limitation as to the scope of use or functionality of embodiments of the invention described herein. Regardless, computerized implementation 1100 is capable of being implemented and/or performing any of the functionality set forth hereinabove.

In computerized implementation 1100, there is a computer system 1112. Examples of well-known computing systems, environments, and/or configurations that may be suitable for use with computer system 1112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 1112 is intended to demonstrate that some or all of the components of implementation 1100 could be deployed, managed, serviced, etc., by a service provider who offers to implement, deploy, and/or perform the functions of the present invention for others.

Computer system 1112 is intended to represent any type of computer system that may be implemented in deploying/realizing the teachings recited herein. Computer system 1112 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 1112 represents an illustrative system for multi-destination probabilistic data replication. It should be understood that any other computers implemented under the present invention may have different components/software, but can perform similar functions.

Computer system 1112 in computerized implementation 1100 is shown in the form of a general-purpose computing device. The components of computer system 1112 may include, but are not limited to, one or more processors or processing units 1116, a system memory 1128, and a bus 1118 that couples various system components including system memory 1128 to processor 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 1116 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 1116 collects and routes signals representing inputs and outputs between external devices 1114 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 1116 executes computer program code, such as program code for multi-destination probabilistic data replication, which is stored in memory 1128, storage system 1134, and/or program/utility 1140. While executing computer program code, processing unit 1116 can read and/or write data to/from memory 1128, storage system 1134, and program/utility 1140.

Computer system 1112 typically includes a variety of computer system readable media. Such media may be any available media that is accessible by computer system 1112, and it includes both volatile and non-volatile media, removable and non-removable media.

System memory 1128 can include computer system readable media in the form of volatile memory, such as random-access memory (RAM) 1130 and/or cache memory 1132. Computer system 1112 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 1118 by one or more data media interfaces. As will be further depicted and described below, memory 1128 may include at least one program product having a set (e.g., at least one) of program modules that are configured to carry out the functions of embodiments of the invention. Program code embodied on a computer readable medium may be transmitted using any appropriate medium including, but not limited to, wireless, wireline, optical fiber cable, radio-frequency (RF), etc., or any suitable combination of the foregoing.

Program/utility 1140, having a set (at least one) of program modules 1142, may be stored in memory 1128 by way of example, and not limitation. Memory 1128 may also have an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein.

Computer system 1112 may also communicate with one or more external devices 1114 such as a keyboard, a pointing device, a display 1124, etc.; one or more devices that enable a consumer to interact with computer system 1112; and/or any devices (e.g., network card, modem, etc.) that enable computer system 1112 to communicate with one or more other computing devices. Such communication can occur via I/O interfaces 1122. Still yet, computer system 1112 can communicate with one or more networks such as a local area network (LAN), a general wide area network (WAN), and/or a public network (e.g., the Internet) via network adapter 1120. As depicted, network adapter 1120 communicates with the other components of computer system 1112 via bus 1118. It should be understood that although not shown, other hardware and/or software components could be used in conjunction with computer system 1112. Examples include, but are not limited to: microcode, device drivers, redundant processing units, external disk drive arrays, RAID systems, tape drives, and data archival storage systems, etc.

As can now be appreciated, disclosed embodiments provide improvements in the technical field of data replication. Probability vectors for used and unused destinations are created and used for selection of destinations to send chunks of a data image. A manifest file is sent to the data replication site to allow it to construct a duplicate data image from chunks arriving from multiple aggregator sites. In this way, data replication is performed in an efficient manner, and adapts to dynamic network conditions to minimize latency and increase data integrity and data redundancy, thereby increasing overall data security.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for transferring a disaster recovery replication image, comprising:
   obtaining a time interval;
   obtaining a data transfer size for a data image;
   dividing the data image into a plurality of chunks;
   generating a manifest, wherein the manifest identifies an assembly order for each chunk of the plurality of chunks;
   selecting an aggregator site for each of the chunks of the plurality of chunks;
   transferring each chunk of the plurality of chunks to a corresponding aggregator site;
   obtaining an actual data transfer rate for each chunk of the plurality of chunks;
   computing a reward function for each aggregator site based on the actual data transfer rate;
   computing an efficacy for each aggregator site based on the reward function; and
   updating a data transfer policy with the computed efficacy.

2. The computer-implemented method of claim 1, further comprising creating a used destination probability vector, wherein the used destination probability vector includes an efficacy value corresponding to a previously used aggregator site.

3. The computer-implemented method of claim 2, further comprising creating an unused destination probability vector, wherein the used destination probability vector includes an efficacy value corresponding to an unused aggregator site.

4. The computer-implemented method of claim 3, further comprising:
   computing a hash for each chunk of the plurality of chunks; and
   recording the hash in a manifest file.

5. The computer-implemented method of claim 4, wherein computing the hash comprises computing an md5 hash.

6. The computer-implemented method of claim 4, wherein computing the hash comprises computing a sha256 hash.

7. The computer-implemented method of claim 4, wherein selecting an aggregator site comprises:
   obtaining an unused destination probability vector;
   obtaining a used destination probability vector;
   obtaining an exploratory constant; and
   selecting a destination from the unused destination probability vector based on a probability having a value of the exploratory constant.

8. The computer-implemented method of claim 7, further comprising selecting a destination from the used probability vector based on a probability having a value of one minus the exploratory constant.

9. The computer-implemented method of claim 8, wherein the exploratory constant has a value ranging from 0.1 to 0.25.

10. The computer-implemented method of claim 1, wherein computing the reward function comprises computing a negated value of one minus a ratio of received data to sent data.

11. An electronic computation device comprising:
   a processor;
   a memory coupled to the processor, the memory containing instructions, that when executed by the processor, cause the electronic computation device to:
   obtain a time interval;
   obtain a data transfer size for a data image;
   divide the data image into a plurality of chunks;
   generate a manifest, wherein the manifest identifies an assembly order for each chunk of the plurality of chunks;
   select an aggregator site for each of the chunks of the plurality of chunks;
   transfer each chunk of the plurality of chunks to a corresponding aggregator site;
   obtain an actual data transfer rate for each chunk of the plurality of chunks;
   compute a reward function for each aggregator site based on the actual data transfer rate;
   compute an efficacy for each aggregator site based on the reward function; and
   update a data transfer policy with the computed efficacy.

12. The electronic computation device of claim 11, wherein the memory further comprises instructions, that when executed by the processor, cause the electronic computation device to create a used destination probability vector, wherein the used destination probability vector includes an efficacy value corresponding to a previously used aggregator site.

13. The electronic computation device of claim 12, wherein the memory further comprises instructions, that when executed by the processor, cause the electronic computation device to create an unused destination probability vector, wherein the used destination probability vector includes an efficacy value corresponding to an unused aggregator site.

14. The electronic computation device of claim 13, wherein the memory further comprises instructions, that when executed by the processor, cause the electronic computation device to:
   compute a hash for each chunk of the plurality of chunks; and
   record the hash in a manifest file.

15. The electronic computation device of claim 14, wherein the memory further comprises instructions, that when executed by the processor, cause the electronic computation device to:
   obtain an unused destination probability vector;
   obtain a used destination probability vector;
   obtain an exploratory constant; and
   select a destination from the unused destination probability vector based on a probability having a value of the exploratory constant.

16. A computer program product for an electronic computation device comprising a computer readable storage medium having program instructions embodied therewith, the program instructions executable by a processor to cause the electronic computation device to:
   obtain a time interval;
   obtain a data transfer size for a data image;
   divide the data image into a plurality of chunks;
   generate a manifest, wherein the manifest identifies an assembly order for each chunk of the plurality of chunks;
   select an aggregator site for each of the chunks of the plurality of chunks;
   transfer each chunk of the plurality of chunks to a corresponding aggregator site;
   obtain an actual data transfer rate for each chunk of the plurality of chunks;
   compute a reward function for each aggregator site based on the actual data transfer rate;
   compute an efficacy for each aggregator site based on the reward function; and
   update a data transfer policy with the computed efficacy.

17. The computer program product of claim 16, wherein the computer program product further includes program instructions, that when executed by the processor, cause the electronic computation device to create a used destination probability vector, wherein the used destination probability vector includes an efficacy value corresponding to a previously used aggregator site.

18. The computer program product of claim 17, wherein the computer program product further includes program instructions, that when executed by the processor, cause the electronic computation device to create an unused destination probability vector, wherein the used destination probability vector includes an efficacy value corresponding to an unused aggregator site.

19. The computer program product of claim 18, wherein the computer program product further includes program instructions, that when executed by the processor, cause the electronic computation device to:
   compute a hash for each chunk of the plurality of chunks; and
   record the hash in a manifest file.

20. The computer program product of claim 19, wherein the computer program product further includes program instructions, that when executed by the processor, cause the electronic computation device to:
   obtain an unused destination probability vector;
   obtain a used destination probability vector;
   obtain an exploratory constant; and
   select a destination from the unused destination probability vector based on a probability having a value of the exploratory constant.

* * * * *